Patented Nov. 25, 1952

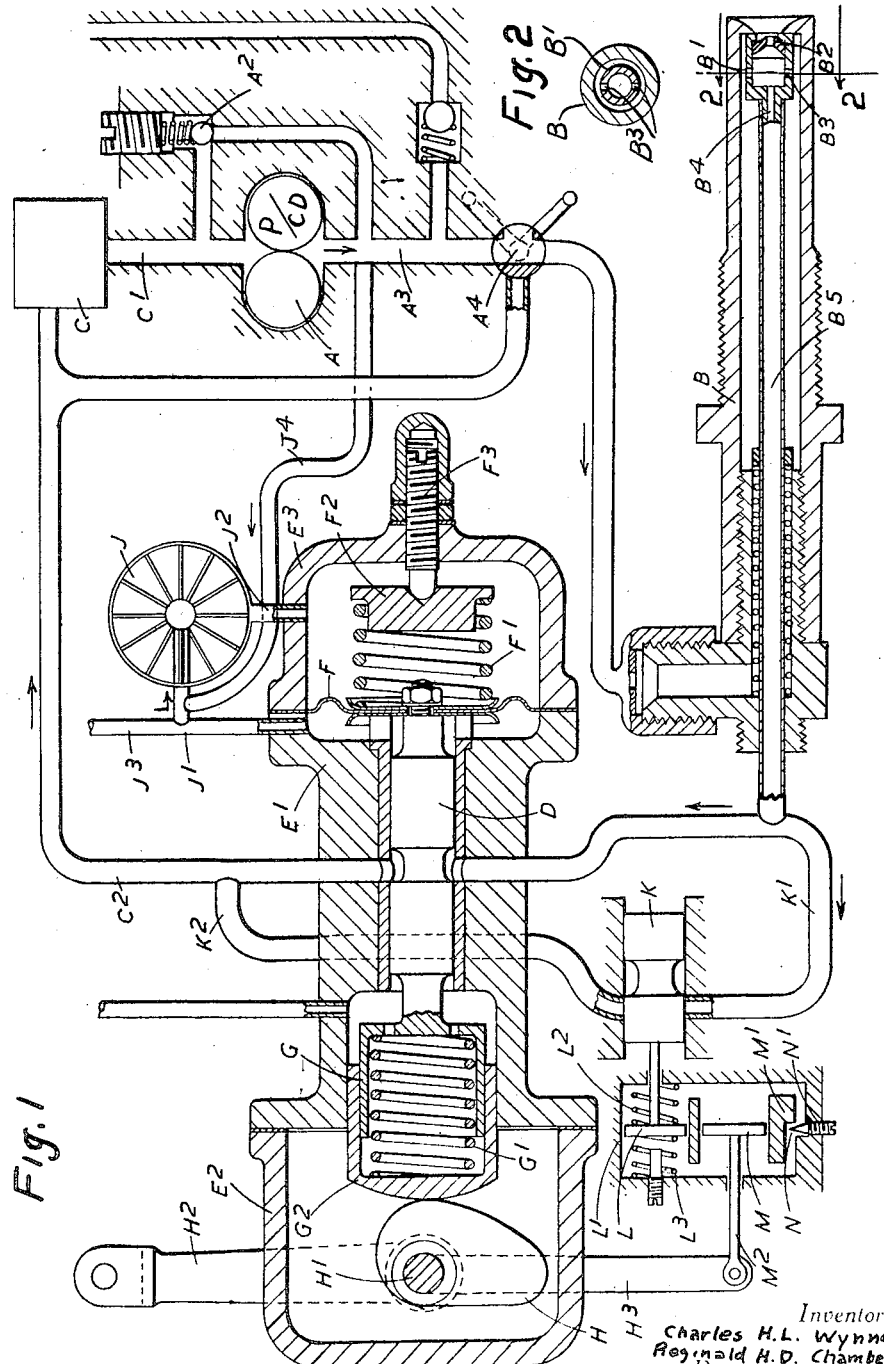

2,619,163

UNITED STATES PATENT OFFICE 2,619,163

APPARATUS FOR GOVERNING THE SUPPLY OF FUEL TO SPILL BURNER TYPE FUEL SUPPLY SYSTEMS FOR JET ENGINES

Charles Horace Lionel Wynne and Reginald Henry Douglas Chamberlin, London, England, assignors to D. Napier & Son Limited, London, England, a company of Great Britain Application September 9, 1948, Serial No. 48,504
In Great Britain September 12, 1947

1 Claim. (Cl. 158—36.3)

This invention relates to apparatus for governing the supply of fuel to a jet propulsion engine equipped with a fuel supply system of the spill burner type. In such a fuel supply system the burner, or each burner, has a whirl chamber through which all the fuel delivered to the burner passes, a proportion of the fuel which enters the whirl chamber passing therefrom through an injection orifice into the associated combustion chamber while the remainder flows away through a spill passage, the rate of injection being controlled by varying the rate at which fuel is permitted to flow away from the burner through the spill passage in relation to the rate at which the fuel is delivered to the burner.

It is an object of the present invention to provide a simple apparatus for governing the supply of fuel in which, under normal operating conditions, the rate of injection is controlled by a single valve in the spill passage.

It is a further object of the invention to provide an apparatus in which the valve is controlled in dependence upon the engine speed, and the relationship between the engine speed and the effective opening of the valve can be varied so that the apparatus will govern the engine to any desired speed.

In general, the apparatus comprises at least one burner of the spill type having a return passage for the spill flow, a pump delivering fuel to said burner at substantially constant pressure, a valve in said return passage controlling the spill flow from the burner, a governing device driven by said engine and responsive to the speed thereof, an operative connection between said governing device and said valve arranged to move said valve in the sense of reducing the spill flow when the engine speed decreases and increasing the spill flow when the engine speed increases, and setting mechanism operative upon said valve for adjusting the relationship between the engine speed and the effective opening of the valve.

One form of the apparatus includes means for delaying the effective operation of the valve when the setting mechanism is rapidly shifted in the direction tending to increase the governed speed of the engine. Such delaying means may include a by-pass for the said valve controlled by an auxiliary valve, a spring tending to close the auxiliary valve, means for opening the auxiliary valve operated by a fluid pressure difference produced by movement of the said setting mechanism, and a throttling orifice for allowing such pressure difference to subside and allow the auxiliary valve to close after an appropriate delay. The auxiliary valve is closed during normal operation and is opened only when the setting mechanism is shifted rapidly in the manner specified above.

The invention may be carried into practice in various ways but one particular arrangement will be described by way of example with reference to the accompanying drawings, Figure 1 of which is a schematic diagram of the fuel governing system and Figure 2 is a cross section of the spill burner on the burner on the line 2—2 in Figure 1.

In the arrangement shown the fuel is supplied from a tank C, through a supply pipe $C^1$ by a constant pressure pump A delivering the fuel at a pressure of approximately 300 pounds per square inch. The pump is provided with a pressure relief valve $A^2$ comprising a spring-pressed ball. The pump delivers fuel through a passage $A^3$ through a shut-off cock $A^4$ to one or more spill burners B.

Each spill burner comprises a tubular body B the end of which accommodates a nozzle chamber $B^1$ containing a nozzle $B^2$. In the peripheral wall of the nozzle chamber are a number of tangential inlet holes $B^3$ while the end wall opposite the nozzle has in it a hole $B^4$ communicating with a spill tube $B^5$. This type of burner is known and will not be described in greater detail. The fuel entering the nozzle chamber through the tangential holes $B^3$ swirls around and while part of it issues through the nozzle in a fine mist the remainder escapes through the spill tube $B^5$. The output can be varied by allowing more or less fuel to escape through the spill tube as hereinafter described but the pressure at which the fuel is supplied to the burner, and the velocity of the fuel, vary but little with the output and are maintained even when the output is reduced.

The spill flow from each burner is taken at low pressure through the pipe $B^5$ past a control valve D and returned to the tank C through a pipe $C^2$, or to the inlet side of the fuel delivery pump A. The valve D is a piston valve arranged in a central casing $E^1$ having at opposite ends caps $E^2$ and $E^3$. Within the chamber formed by the cap $E^3$ the end of the valve is secured to a diaphragm F acted upon by a spring $F^1$ the opposite end of which engages a disc $F^2$ which is adjustable by means of an adjusting screw $F^3$.

In the chamber formed by the cap $E^2$ the end of the piston valve is formed into a cup G within which is a spring $G^1$ the end of which abuts against a further cup $G^2$ constituting a cam follower acted upon by a cam H. The cam, mounted on a shaft $H^1$, is operated by a manually-controlled lever $H^2$.

The diaphragm F is subjected to a pressure difference by means of an impeller J driven by the engine (not shown). The inlet or suction side $J^1$ of the impeller, communicating with the eye of the impeller, is connected to the lefthand side of the diaphragm F as seen in the drawing, whilst the periphery or delivery side $J^2$ is connected to its righthand side. The inlet $J^1$ also communicates either through a passage $J^3$ with a booster pump (not shown), or through a passage $J^4$ with the high pressure side of the fuel pump A. With the latter alternative the passage $J^3$ is closed or omitted.

Thus in operation the spill flow from the spill burner is controlled by the piston valve D. If the engine speed is below the desired value the pressure developed by the impeller will be reduced and the piston valve will move to the right under the action of the spring $F^1$ and $G^1$, thereby tending to close the piston valve and reduce the spill flow and hence increase the output of the burner. In order to increase the speed the pilot's lever $H^2$ is turned in an anti-clockwise direction so as to increase the pressure exerted by the spring $G^1$ at a given position of the valve. Accordingly the valve D will move to the right tending to reduce the spill flow and increase the output of the burner. The engine speed will therefore increase until the pressure developed by the engine-driven impeller and acting on the diaphragm F restores the valve to its new equilibrium position. In order to ensure that the movement of the pilot's lever will be approximately linear with speed, whilst the pressure developed by the impeller J varies approximately as the square of the speed, the cam H is shaped in accordance with a square law.

In order to prevent overheating due to a too sudden movement of the pilot's lever means is provided for by-passing the valve D in certain circumstances. Such means includes a by-pass valve K of piston type serving to connect together a branch passage $K^1$ connected to the pipe $B^5$ and a branch passage $K^2$ connected to the pipe $C^2$. The by-pass valve K is operated by a piston L located in a cylinder $L^1$ and acted upon by a pair of opposed springs $L^2$ and $L^3$. This piston is connected in parallel with an operating piston M located in a cylinder $M^1$ and having a piston rod $M^2$ pivotally connected to an arm $H^3$ carried by the shaft $H^1$ of the cam H. Opposite ends of the cylinders $L^1$ and $M^1$ are connected together through an orifice N controlled by an adjusting screw $N^1$.

Accordingly if the pilot's lever $H^2$ is moved suddenly in an anti-clockwise direction to increase the fuel supply the piston M will be correspondingly moved to the right and the resulting pressure difference will force the piston L to the left, thereby opening the by-pass valve K and allowing the spill flow from the burner to pass through it. Accordingly the action of the main valve D will for the time being be nullified and even if it closes completely the spill flow will not be completely cut off. At the same time however fluid will begin to flow from one side to the other of the piston M through the orifice N at a rate controlled by the adjustment of the screw $N^1$ and hence the valve K will gradually close again.

Accordingly the rate at which the spill flow is reduced is limited and hence the engine can keep pace with the change of adjustment enabling the impeller J to develop an opposing pressure and establish equilibrium conditions. The rate of response is rapid at first and slows down as the equilibrium speed is reached.

When a state of balance is reached any increase in speed is immediately reflected in the pressure differential between the inlet and delivery of the impeller. Thus if speed tends to increase a greater load is imposed on the spring and the spill valve moves to increase spill fuel flow, and vice versa. A limiting speed is therefore determined by the load applied to the spring.

In the event of diaphragm leakage the pilot retains control but will have to adjust the lever position for changes of altitude or attitude in order to maintain constant speed. In the event of breakage of the spring the pilot still retains control but there will be a limitation of maximum speed.

The apparatus described operates on a selected speed basis and embodies a medium pressure system. The rate of response increases with the degree of off-speed. It eliminates the necessity for an additional over-speed device and simplifies starting and avoids the necessity of providing an accumulator. On-speed condition is obtained by balance of load and is therefore independent of spring rate. Spring rate is used independently to control response rate.

Since the speed-sensitive part of the device is in parallel with the fuel line and is dependent on fuel flow in that line response is instantaneous. While the improved apparatus cannot anticipate, on the other hand it cannot lag as a centrifugal governor tends to do. It will be appreciated that the operating element comprises one moving part, namely the valve controlling the spill flow, and this is always in hydraulic balance and therefore substantially without friction. Any damping can be carried out hydraulically.

What we claim as our invention and desire to secure by Letters Patent is:

Apparatus for governing the supply of fuel to a jet propulsion engine comprising in combination at least one burner of the spill type having a return passage for the spill flow, a pump delivering fuel to said burner at substantially constant pressure, a valve in said return passage controlling the spill flow from the burner, a governing device adapted to be driven by said engine and responsive to the speed thereof, an operative connection between said governing device and said valve arranged to move said valve in the sense of reducing the spill flow when the engine speed decreases and increasing the spill flow when the engine speed increases, manual setting mechanism operative upon said valve for adjusting the relationship between the engine speed and the effective opening of the valve, delay means adapted to delay the effective operation of said valve and comprising a by-pass for the said valve controlled by an auxiliary valve, a spring tending to close said auxiliary valve, means for opening said auxiliary valve operated by a fluid pressure difference produced by rapid movement of said manual setting mechanism in the direction tending to reduce the spill flow, and a throttling orifice for allowing such fluid pressure difference to subside and allow the auxiliary valve to close after an appropriate delay.

CHARLES HORACE LIONEL
WYNNE.
REGINALD HENRY DOUGLAS
CHAMBERLIN.

(References on following page)

REFERENCES CITED

The following references are of record in the file of this patent:

UNITED STATES PATENTS

| Number | Name | Date |
|---|---|---|
| 289,246 | Galloway et al. | Nov. 27, 1883 |
| 1,582,080 | Peabody | Apr. 27, 1926 |
| 1,583,610 | Scott | May 4, 1926 |
| 2,081,188 | Walker et al. | May 25, 1937 |
| 2,115,665 | De Florez | Apr. 26, 1938 |
| 2,371,793 | Bourland et al. | Mar. 20, 1945 |
| 2,384,340 | Reggio | Sept. 4, 1945 |
| 2,411,065 | Silvester | Nov. 12, 1946 |
| 2,426,153 | Mock | Aug. 19, 1947 |
| 2,457,595 | Orr | Dec. 28, 1948 |

FOREIGN PATENTS

| Number | Country | Date |
|---|---|---|
| 918,129 | France | Oct. 7, 1946 |